(12) United States Patent
Dierksmeier

(10) Patent No.: US 10,989,062 B2
(45) Date of Patent: Apr. 27, 2021

(54) BLADE TIP CLEARANCE ASSEMBLY WITH GEARED CAM

(71) Applicant: Rolls-Royce North American Technologies Inc., Indianapolis, IN (US)

(72) Inventor: Douglas David Dierksmeier, Franklin, IN (US)

(73) Assignee: ROLLS-ROYCE NORTH AMERICAN TECHNOLOGIES INC., Indianapolis, IN (US)

( * ) Notice: Subject to any disclaimer, the term of this patent is extended or adjusted under 35 U.S.C. 154(b) by 76 days.

(21) Appl. No.: 16/388,152

(22) Filed: Apr. 18, 2019

(65) Prior Publication Data

US 2020/0332672 A1   Oct. 22, 2020

(51) Int. Cl.
| | |
|---|---|
| *F01D 11/14* | (2006.01) |
| *F01D 11/22* | (2006.01) |
| *F16H 25/18* | (2006.01) |
| *F16H 1/10* | (2006.01) |

(52) U.S. Cl.
CPC .............. *F01D 11/22* (2013.01); *F16H 1/10* (2013.01); *F16H 25/18* (2013.01);
(Continued)

(58) Field of Classification Search
CPC .......... F01D 11/14; F01D 11/16; F01D 11/18; F01D 11/20; F01D 11/22; F05D 2220/32;
(Continued)

(56) References Cited

U.S. PATENT DOCUMENTS

| | | |
|---|---|---|
| 3,085,398 A | 4/1963 | Ingleson |
| 5,018,942 A | 5/1991 | Ciokajlo et al. |
| (Continued) | | |

FOREIGN PATENT DOCUMENTS

GB     2068470 A  *  8/1981  ............. F01D 11/22

OTHER PUBLICATIONS

Lattime, S.B., et al., "Turbine Engine Clearance Control Systems: Current Practices and Future Directions", Joint Propulsion Conference & Exhibit, Jul. 2002, NASA TM-2002-211794, 22pgs.
(Continued)

*Primary Examiner* — Woody A Lee, Jr.
*Assistant Examiner* — Maxime M Adjagbe
(74) *Attorney, Agent, or Firm* — Brinks Gilson & Lione

(57) ABSTRACT

An assembly is disclosed for adjusting the radial position of a blade track relative to a blade of a turbine stage in a gas turbine engine. The assembly comprises a static turbine casing, a blade track carrier, a blade track support assembly, an actuator, and a blade track. The blade track carrier comprises a pair of radially extending flanges each defining at least one bore in radial and axial alignment with each other forming a pair of bores. The blade track support assembly comprises a portion extending through each bore in a pair of bores, and one or more cam-shaped portions rotatable about an axis of rotation. The blade track has an arcuate flange and a support flange, the support flange being carried by the cam-shaped portion of the blade track support assembly such that rotation of the cam-shaped portion effects radial movement of the blade track.

19 Claims, 3 Drawing Sheets

(52) U.S. Cl.
CPC ...... *F05D 2220/32* (2013.01); *F05D 2240/10* (2013.01); *F05D 2260/53* (2013.01); *F05D 2260/56* (2013.01); *F05D 2300/6033* (2013.01)

(58) Field of Classification Search
CPC ............ F05D 2240/10; F05D 2260/53; F05D 2260/56; F05D 2300/6033; F16H 1/10; F16H 25/18
See application file for complete search history.

(56) References Cited

U.S. PATENT DOCUMENTS

| | | | |
|---|---|---|---|
| 5,049,033 | A | 9/1991 | Corsmeier et al. |
| 9,915,163 | B2 * | 3/2018 | McCaffrey .............. F01D 11/22 |
| 9,963,990 | B2 | 5/2018 | Vetters et al. |
| 10,066,497 | B2 | 9/2018 | Duguay |
| 10,087,770 | B2 | 10/2018 | Vetters et al. |
| 10,132,186 | B2 * | 11/2018 | Shapiro ................... F01D 11/16 |
| 10,221,713 | B2 | 3/2019 | Vetters et al. |
| 2017/0044920 | A1 | 2/2017 | Vetters et al. |
| 2017/0044921 | A1 | 2/2017 | Vetters et al. |
| 2017/0306785 | A1 | 10/2017 | Rioux et al. |
| 2017/0328230 | A1 | 11/2017 | Virkler |
| 2018/0283196 | A1 | 10/2018 | Powell |

OTHER PUBLICATIONS

Peng, K., et al., "Active Generalized Predictive Control of Turbine Tip Clearance for Aero-Engines", Chinese Journal of Aeronautics, Oct. 2013, vol. 26, Issue 5, pp. 1147-1155.

* cited by examiner

BLADE TIP CLEARANCE ASSEMBLY WITH GEARED CAM

BACKGROUND

Rotating machines may comprise a bladed disc, typically attached to a rotating shaft, encased by a shroud. Examples include axial compressors, centrifugal compressors, and turbines.

In many applications of rotating machines, such as a gas turbine engine, systems and methods are employed to ensure an appropriate gap is maintained between the blade tips of the bladed disc and the shroud. This gap is often referred to as the blade tip clearance, and is an important factor in determining the efficiency of an engine. An insufficient gap increases the risk that a blade tip will impinge—or rub—against the shroud, potentially damaging one or both of the blades and shroud and ultimately reducing engine efficiency. Conversely, when an excessive gap exists gasses flowing through the engine may pass between the blade tips and the shroud, thus constituting leakage which also reduces the engine efficiency. Maintaining an appropriately-sized blade tip clearance through a wide range of operating conditions and transients is therefore important to the efficient operation of a turbine engine or, indeed, many rotating machines.

SUMMARY

According to some aspects of the present disclosure, an assembly for adjusting the radial position of one or more blade tracks, radially encasing the blades of a turbine stage in a gas turbine engine, may include a static turbine casing and a plurality of blade track carriers carried by the casing, which may form a segmented annular member extending around a circumference of and radially inward of the turbine casing. Each of the blade track carriers may include a pair of radially extending flanges spaced apart by an axial flange to define a carrier channel, each of the radially extending flanges may define at least one bore in radial and axial alignment with each other forming a pair of bores. The assembly may also include a plurality of blade track support assemblies. Each blade track support assembly may have an axis of rotation parallel to an axis of the casing. Each of the assemblies may include a portion extending through each bore in a pair of bores, one or more cam-shaped portions rotatable about the axis of rotation, an actuator to rotate each of the cam-shaped portions about the axis of rotation, and a plurality of blade tracks. Each blade track may include an arcuate flange having a radially inner surface, forming at least a part of a radially outer flowpath boundary in the turbine stage, and a support flange extending radially from the arcuate flange into the carrier channel of a blade track carrier. The support flange may be carried by the one or more cam-shaped portions of the blade track support assemblies such that rotation of the one or more cam-shaped portion effects radial movement of the blade track.

In some embodiments, the actuator may include an annular gear ring carried by the turbine casing, and wherein each of the plurality of blade track support assemblies may include a geared head engaged with the gear ring. In some embodiments, the actuator further may include a pinion gear carried by the turbine casing and engaged with the annular gear ring. In some embodiments, the actuator further may include a lever arm coupled to the pinion gear and positioned radially outward from the turbine casing. Some embodiments may further include, a spring washer disposed between one of the radially extending flanges of the blade track carrier and the geared head of one of the plurality of blade track support assemblies. In some embodiments, the actuator further may include at least three lever arms and at least three pinion gears, each of the pinion gears spaced about the circumference of and carried the turbine casing, each of the pinion gears coupled to a respective one of the lever arms, and each of the pinion gears engaged with the annular gear ring.

Some embodiments may further include, a unison ring coupled to each of the at least three lever arms for uniform articulation of the lever arms. In some embodiments, the support flange of each blade track defines a blade track bore, and the cam-shaped portion of each of the plurality of blade track support assemblies extends through a respective blade track bore to thereby carry a respective blade track. In some embodiments, the support flange of each blade track defines a forward lip and an aft lip, and wherein the cam-shaped portion of each of the plurality of blade track support assemblies may include first and second axial ends connected by a cross member, the first axial end positioned against the forward lip and the second axial end positioned against the aft lip to thereby carry the blade track. In some embodiments, the major surfaces of each radially extending flange extend laterally and are perpendicular to the axis of rotation of the turbine stage. In some embodiments, the turbine casing may include a forward hook and an aft hook, and wherein the blade track carrier may include a forward mount arm and an aft mount arm, the blade track carrier carried by the turbine casing by engagement of the forward mount arm with the forward hook and the aft mount arm with the aft hook. In some embodiments, the blade track may include ceramic matrix composite.

According to some aspects of the present disclosure, an assembly for adjusting the radial position of a blade track relative to a blade of a turbine stage in a gas turbine engine may include a static turbine casing; a blade track carrier carried by the casing. The blade track carrier may be positioned radially inward of the turbine casing and may include a pair of radially extending flanges spaced apart by an axial flange to define a carrier channel. Each of the radially extending flanges may define at least one bore in radial and axial alignment with each other forming a pair of bores. A blade track support assembly may have an axis of rotation parallel to an axis of the casing. The assembly may include a portion extending through each bore in a pair of bores, one or more cam-shaped portions rotatable about the axis of rotation, and an actuator for rotating the cam-shaped portion about the axis of rotation. A blade track may include an arcuate flange having a radially inner surface forming at least a part of a radially outer flowpath boundary in the turbine stage and a support flange extending radially from the arcuate flange into the carrier channel of the blade track carrier, the support flange being carried by the cam-shaped portion of the blade track support assembly such that rotation of the cam-shaped portion effects radial movement of the blade track.

In some embodiments, the support flange of the blade track defines a blade track bore, and the cam-shaped portion of the blade track support assembly extends through the blade track bore to thereby carry the blade track. In some embodiments, the support flange of the blade track defines a forward lip and an aft lip, and wherein the cam-shaped portion of the blade track support assembly may include first and second axial ends connected by a cross member, the first axial end positioned against the forward lip and the second axial end positioned against the aft lip to thereby carry the blade track.

According to some aspects of the present disclosure, a method of adjusting the radial position of one or more blade tracks in a turbine engine having a static turbine casing and a turbine stage may include carrying a plurality of blade track carriers by the turbine casing to thereby form a segmented annular member extending around a circumference of and radially inward of the turbine casing. Each of the blade track carriers may include a pair of radially extending flanges spaced apart by an axial flange to define a carrier channel. Each of the radially extending flanges may define at least one bore in radial and axial alignment with each other forming a pair of bores. The method may further include carrying a plurality of blade tracks with one or more of the plurality of blade track carriers. Each blade track carried by a blade track support assembly may include a portion extending through each bore in a pair of bores, and one or more cam-shaped portions rotatable about the axis of rotation. The method may further include engaging the blade track support assembly with an actuator for rotating the blade track support assembly, and actuating the actuator to rotate the blade track support assembly and thereby effect radial movement of the blade track.

In some embodiments, the actuator may include an annular gear ring engaged with the blade track support assembly, the step of actuating the actuator may include: rotating the annular gear ring to effect rotation of the blade track support assembly. In some embodiments, the actuator further may include a lever arm coupled to the annular gear ring by one or more pinion gears, and wherein the step of actuating the actuator may include articulating the lever arm. Some embodiments may further include, measuring a clearance gap between a blade tip of the turbine stage and the radially inner surface of the blade tracks; and actuating the actuator responsive to the measured clearance gap. Some embodiments may further include, inferring a clearance gap between a blade tip of the turbine stage and the radially inner surface of the blade tracks; and actuating the actuator responsive to the inferred clearance gap.

BRIEF DESCRIPTION OF THE DRAWINGS

The following will be apparent from elements of the figures, which are provided for illustrative purposes.

Figure 1:
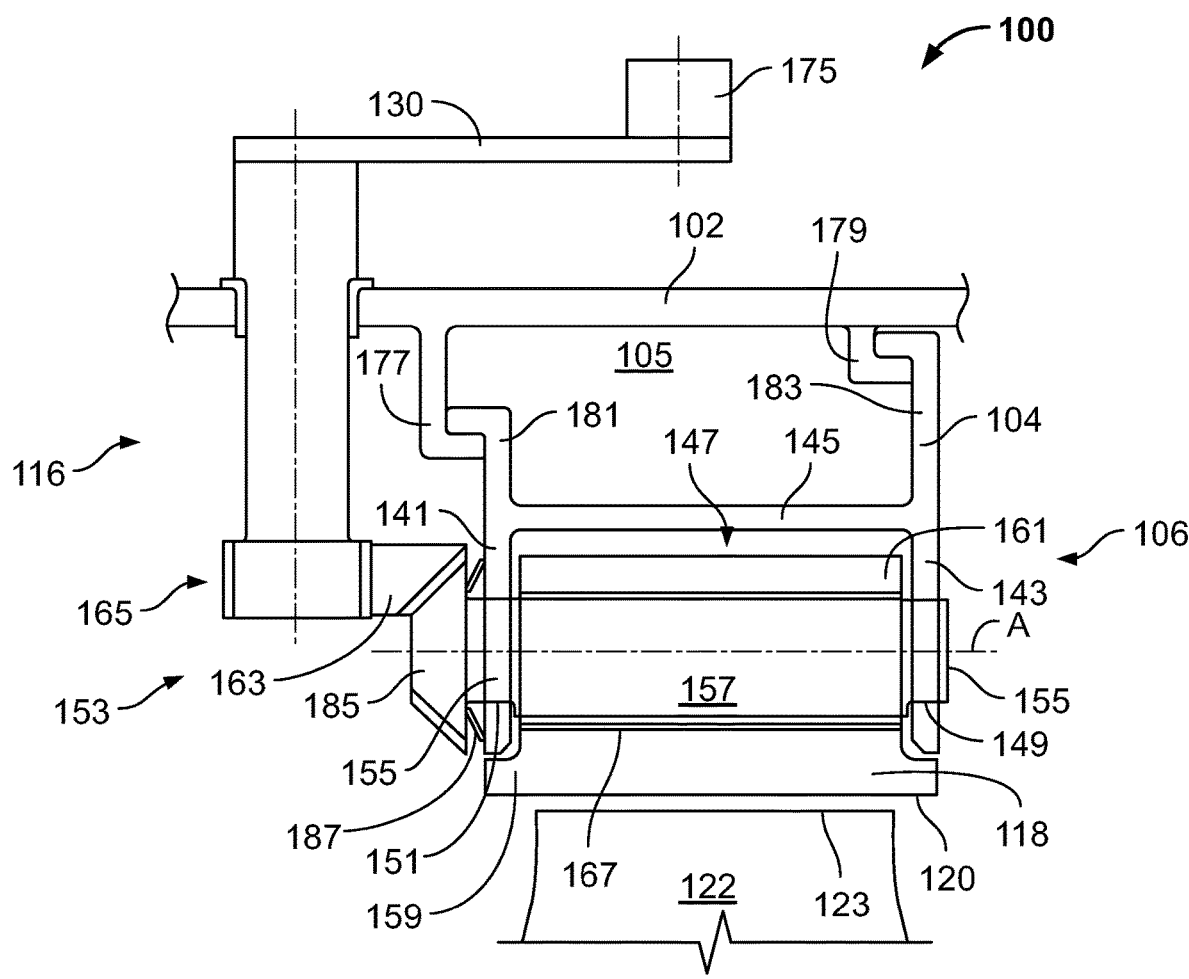
FIG. 1 is a schematic and cross sectional view of a blade tip clearance control assembly in accordance with some embodiments of the present disclosure.

The present application discloses illustrative (i.e., example) embodiments. The claimed inventions are not limited to the illustrative embodiments. Therefore, many implementations of the claims will be different than the illustrative embodiments. Various modifications can be made to the claimed inventions without departing from the spirit and scope of the disclosure. The claims are intended to cover implementations with such modifications.

DETAILED DESCRIPTION

For the purposes of promoting an understanding of the principles of the disclosure, reference will now be made to a number of illustrative embodiments in the drawings and specific language will be used to describe the same.

Existing solutions for maintaining an appropriately-sized blade tip clearance through a wide range of operating conditions and transients typically requires the use of complex pneumatic systems such as those that use cooling air to position a shroud relative to blade tips. For example, in certain blade tip clearance systems in use today, the shroud and an engine casing thermally expand together, and cooling air is applied to the engine casing to reduce thermal expansion and thus hold the shroud in an appropriate radial position relative to a rotating blade.

Many blade tip clearance systems are complex, have many parts, and are expensive to both manufacture and maintain. Further, some systems rely on thermally expanding and contracting the shroud to adjust the radial positioning of the shroud; these systems often have a substantial delay time when responding to operating transients and don't allow for precise adjustments to the radial position of the shroud.

The present disclosure is therefore directed to systems and methods to overcome the aforementioned shortcomings of the prior art. More specifically, the present disclosure is directed to an assembly for adjusting the radial position of a blade track of a shroud relative to blade tips that has a mechanical actuator that allows for rapid and precise radial positioning of a blade track. The present disclosure is further directed to methods of controlling the radial position of a blade track and/or reducing blade tip rub.

Figure 2:
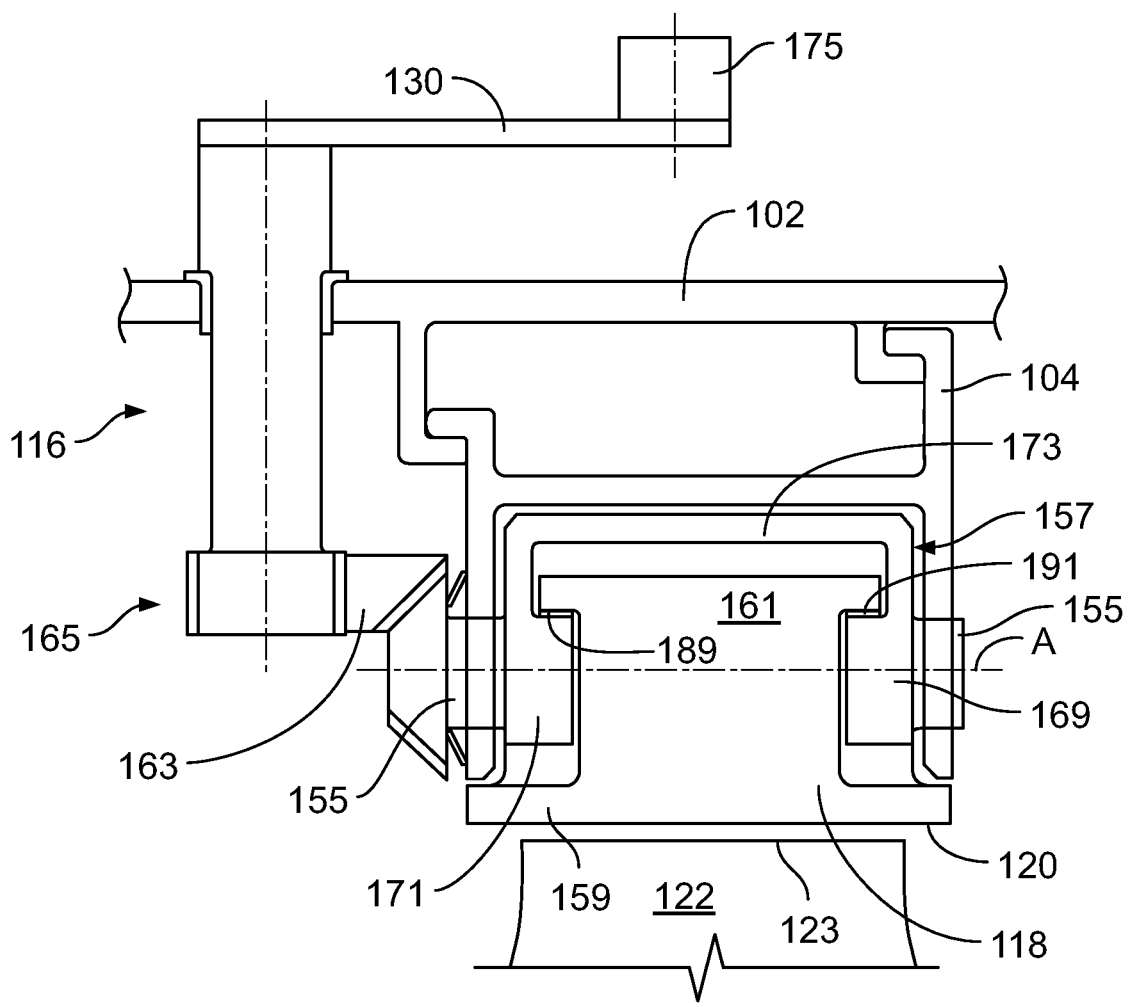
FIG. 2 is a schematic and cross sectional view of a blade tip clearance control assembly in accordance with some embodiments of the present disclosure.

FIGS. 1 and 2 provide schematic and cross sectional views of an assembly 100 for adjusting the radial position of a blade track 118 relative to blade tips 123.

An assembly 100 for adjusting the radial position of one or more blade tracks 118 may comprise a static turbine casing 102, a plurality of blade track carriers 104, a plurality of blade track support assemblies 153, an actuator 116, and a plurality of blade tracks 118. The static turbine casing 102 may at least partly encase a turbine stage 124 of a gas turbine engine or similar rotating machine. The turbine stage 124 may comprise a bladed disk having a plurality of blades 122 spaced about the circumference of and extending radially outward from a rotor. Each blade 122 terminates in a blade tip 123. The bladed disk may define an axis of rotation. The turbine casing 102 may define an axis.

A plurality of blade track carriers 104 are carried by the turbine casing 102 and form a segmented annular member 106 that extends around a circumference of the turbine casing 102 and is spaced radially inward from the turbine casing 102. The turbine casing 102 and plurality of blade track carriers 104 may at least partly define an annulus 105 that spaces the blade track carriers 104 from the turbine casing 102.

Each of the plurality of blade track carriers 104 may comprise a pair of radially extending flanges 141, 143 spaced apart by an axial flange 145 to define a carrier channel 147. A forward radially extending flange 141 may be positioned axially forward of an aft radially extending flange 143. The forward radially extending flange 141 may define at least one forward flange bore 151, and the aft radially extending flange 143 may define at least one aft flange bore 149. The forward flange bore 151 and the aft flange bore 149 may be radially and axially aligned to for a pair of bores. The major surfaces of each radially extending flange 141, 143 may extend laterally and be perpendicular to the axis of the turbine casing 102 and/or the axis of rotation of the turbine stage 124.

The turbine casing 102 may comprise a forward hook 177 and an aft hook 179. Each of the plurality of blade track carriers 104 may define a forward mount arm 181 and an aft mount arm 183. A blade track carrier 104 may be carried by the turbine casing 102 by engagement of the forward mount arm 181 with the forward hook 177 and/or the aft mount arm 183 with the aft hook 179.

The plurality of blade track support assemblies 153 may each have an axis of rotation A parallel to the axis of rotation of the turbine stage 124 and/or the axis of the turbine casing 102. Each assembly 153 may comprise a portion 155 that extends through each bore 149, 151 in a pair of bores, and one or more cam-shaped portions 157 rotatable about the axis of rotation A.

In some embodiments, as shown in FIG. 1, the portion 155 and cam-shaped portion 157 may be formed as a unitary shaft, with the portion 155 extending through each of the bores 149, 151 and a central cam-shaped portion 157. In other embodiments, as shown in FIG. 2, the cam-shaped portion 157 may comprise a first axial end 169 and a second axial end 171 connected by a cross member 173. This cam-shaped portion 157 may be positioned between the portion 155 extending through each of the bores 149, 151.

In some embodiments the blade track support assembly 153 may further comprise a geared head 185. The geared head 185 may extend from the portion 155 and may be engaged with an actuator 116.

The actuator 116 may be engaged with or coupled to one or more blade track support assemblies 153. The actuator 116 may rotate one or more blade track support assemblies 153, and/or may rotate the cam-shaped portion 157 of the blade track support assemblies 153.

In some embodiments the actuator 116 may comprise an annular gear ring 163 carried by the turbine casing 102, and one or more the blade track support assemblies 153 may be engaged with the gear ring 163. The geared head 185 of one or more blade track support assemblies 153 may have gear teeth enmeshed with the gear teeth of the gear ring 163 to thereby engage the blade track support assembly 153 with the gear ring 163. Rotation of the gear ring 163 may effect rotation of the geared head 185 and/or the blade track support assembly 153 and/or the cam-shaped portion 157.

In some embodiments the actuator 116 may further comprise one or more pinion gears 165 engaged with the gear ring 163. The pinion gear 165 may be carried by the turbine casing 102. Rotation of the pinion gear 165 may effect rotation of the gear ring 163. In embodiments having more than one pinion gear 165, the pinion gears 165 may be spaced about a circumference of the turbine casing 102. The actuator 116 may further comprise one or more lever arms 130 coupled to the pinion gear 165, and articulation of the lever arm 130 may cause rotation of the pinion gear 165. The lever arm 130 may be positioned radially outward of the turbine casing 102. In some embodiments the assembly 100 comprises an actuator 116 comprising at least three lever arms 130 and at least three pinion gears 165, with a respective lever arm 130 coupled to a respective pinion gear 165 and the pinion gears 165 spaced about the circumference of the turbine casing 102. The gear teeth of the pinion gears 165 may act as cross keys to keep the gear ring 163 concentric about the axis of rotation of the turbine stage 124 and/or the axis of the turbine casing 102.

In other embodiments the actuator 116 may be a pneumatic, hydraulic, electric, or mechanical actuator 116.

In some embodiments a unison ring 175 may be coupled to each of the one or more lever arms 130 to effect substantially uniform articulation of the one or more lever arms 130.

In some embodiments a spring washer 187 may be positioned between a blade track support assembly 153 and the blade track carrier 104 to assist with engagement of the blade track support assembly 153 and the actuator 116. The spring washer 187 may be positioned between forward radially extending flange 141 and the geared head 185 to assist with engagement of the geared head 185 to the gear ring 163.

One or more of the plurality of blade tracks 118 may comprise an arcuate flange 159 and a support flange 161 extending radially from the arcuate flange 159. The arcuate flange 159 may have a radially inner surface 120 that forms at least a part of a radially outer flowpath boundary of the turbine stage 124. The support flange 161 may extend into a carrier channel 147 of one or more blade track carriers 104.

The support flange 161 may be carried by one or more cam-shaped portions 157 of a blade track support assembly 153 such that rotation of the one or more cam-shaped portions 157 effects radial movement of the blade track 118. In some embodiments, pressure loading of the blade track 118 during operation of the turbine stage 124 may tend to force the blade track 118 in a radially inward direction while the cam-shaped portion 157 of the blade track support assembly 153 will move the blade tracks 118 in a radially outward direction.

In some embodiments, as shown in FIG. 1, the portion 155 and cam-shaped portion 157 may be formed as a unitary shaft, with the portion 155 extending through each of the bores 149, 151 and a central cam-shaped portion 157. The support flange 161 may define a blade track bore 167 extending through the support flange 161 in an axial direction. The cam-shaped portion 157 may be disposed in the blade track bore 167 to thereby carry the blade track 118. Rotation of the cam-shaped portion 157 may be translated through the blade track bore 167 and support flange 161 to effect radial movement of the blade track 118.

In other embodiments, as shown in FIG. 2, the cam-shaped portion 157 may comprise a first axial end 169 and a second axial end 171 connected by a cross member 173. This cam-shaped portion 157 may be positioned between the portion 155 extending through each of the bores 149, 151. The support flange 161 may define a forward lip 189 and an aft lip 191. The first axial end 169 of the cam-shaped portion 157 may be positioned against the forward lip 189 and/or the second axial end 171 may be positioned against the aft lip 191 to thereby carry the blade track 118. Rotation of the cam-shaped portion 157 may be translated through the forward lip 189 and/or aft lip 191 to effect radial movement of the blade track 118.

One or more blade tracks 118 may comprise ceramic matrix composite. One or more blade tracks 118 may be formed substantially as described in one or more of U.S. Pat. Nos. 9,963,990; 10,087,770; 10,221,713; and U.S. Patent Publication Nos. 2017/0044920 and 2017/0044921.

In some embodiments, an assembly 100 for adjusting the radial position of a blade track 118 may comprise a static turbine casing 102, a blade track carrier 104, a blade track support assembly 153, an actuator 116, and a blade track 118.

A blade tip clearance 125 is the distance between a blade tip 123 and the radially inner surface 120 of a blade track 118. The radially inner surface 120 of each blade track 118 may be angled relative to the axis of rotation of the turbine stage 124.

During operation, the blade tip clearance 125 may be measured, for example with sensors positioned at, in, on, or proximate the radially inner surface 120, or may be inferred, for example through the use of a parameter schedule that correlates various operating conditions of the engine with an expected blade tip clearance 125. The radial position of a blade track 118, and thus the blade tip clearance 125, may also be controlled on a schedule based on operating parameters and conditions or the engine mode.

If the blade tip clearance 125 is determined to be too small, thus risking impingement of a blade tip 123 against the radially inner surface 120, then the radial position of one or more blade tracks 118 may be adjusted. The determination that a blade tip clearance 125 is too small may be made at a controller. The determination that a blade tip clearance 125 is too small may be made by comparing a measured or inferred clearance 125 with a predetermined maximum desired clearance.

Similarly, the blade tip clearance 125 may be determined to be too large. If the blade tip clearance 125 is determined to be too large, thus reducing efficiency of the turbine stage 124 due to leakage between blade tips 123 and radially inner surface 120, then the radial position of one or more blade tracks 118 may be adjusted. The determination that a blade tip clearance 125 is too large may be made at a controller. The determination that a blade tip clearance 125 is too large may be made by comparing a measured or inferred clearance 125 with a predetermined maximum desired clearance.

To adjust the radial position of one or more blade tracks 118, the actuator 116 may be actuated to effect rotation of one or more blade track support assemblies 153. As described above, actuating the actuator 116 may comprise, for example, articulating a lever arm 130 to effect rotation of a pinion gear 165. This rotation of the pinion gear 165 may cause rotation of a gear ring 163, which causes rotation of one or more blade track support assemblies 153 and/or one or more cam-shaped portions 157. The rotation of a cam-shaped portion 157 effects radial movement of the blade track 118, thus adjusting the radial position of the blade track 118.

In some embodiments, all actuators 116 positioned about a circumference of a turbine casing 102 for a turbine stage 124 are actuated together. For example, the actuators 116 may be joined together by a unison ring 175, to ensure uniform positioning of the actuators 116 and therefore uniform radial positioning of the blade tracks 118. In such embodiments, the blade tracks 118 may have radially inner surfaces 120 that define an axisymmetric radially outer flowpath boundary of the turbine stage 124.

Although the figures herein illustrate an assembly for adjusting the radial position of one or more blade tracks in a single turbine stage 124, the present disclosure may be applied across multiple stages of a turbine. Thus, the present disclosure allows for the adjustment of flowpath boundaries of individual and independent stages.

Figure 3:
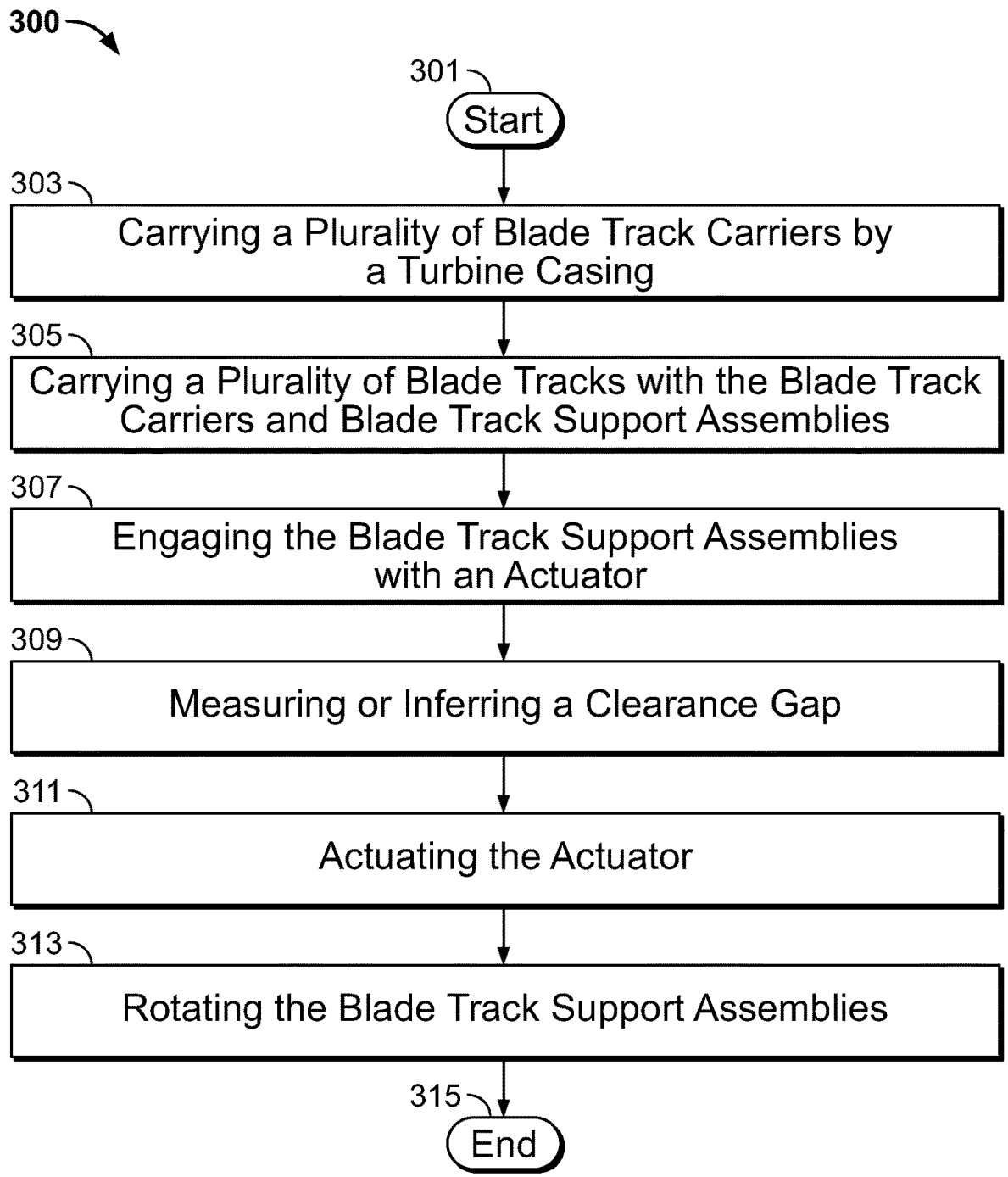
FIG. 3 is a flow diagram of a method in accordance with some embodiments of the present disclosure.

The present disclosure further provides methods of controlling and/or adjusting blade tip clearance and/or reducing blade tip rub. One such method 300 is presented in the flow diagram of FIG. 3. Method 300 starts at Block 301. The steps of method 300, presented at Blocks 301 through 315, may be performed in the order presented in FIG. 3 or in another order. One or more steps of the method 300 may not be performed. Method 300 may be performed in a turbine engine having a static turbine casing 102 and a turbine stage 124.

At Block 303 one or more blade track carriers 104 may be carried by the turbine casing 102. Each of the blade track carriers 104 may comprise a pair of radially extending flanges 141, 143 spaced apart by an axial flange 145 to define a carrier channel 147. A forward radially extending flange 141 may define at least one forward flange bore 151, and an aft radially extending flange 143 may define at least one aft flange bore 149. The forward flange bore 151 and the aft flange bore 149 may be radially and axially aligned to for a pair of bores.

At Block 305 a plurality of blade tracks 118 may be carried with one or more blade track carriers 104 and one or more blade track support assemblies 153. One or more blade track support assemblies 153 may each have an axis of rotation A parallel to the axis of rotation of the turbine stage 124 and/or the axis of the turbine casing 102. Each assembly 153 may comprise a portion 155 that extends through each bore 149, 151 in a pair of bores, and one or more cam-shaped portions 157 rotatable about the axis of rotation A. Each blade track 118 may comprise a radially inner surface 120 forming a portion of a radially outer flowpath boundary of the turbine stage 124.

At Block 307 the blade track support assemblies may be engaged with an actuator 116. The actuator 116 may rotate one or more blade track support assemblies 153, and/or may rotate the cam-shaped portion 157 of the blade track support assemblies 153. In some embodiments the actuator 116 may comprise an annular gear ring 163 carried by the turbine casing 102, and one or more the blade track support assemblies 153 may be engaged with the gear ring 163. In some embodiments the actuator 116 may further comprise one or more pinion gears 165 engaged with the gear ring 163. The actuator 116 may further comprise one or more lever arms 130 coupled to the pinion gear 165, and articulation of the lever arm 130 may cause rotation of the pinion gear 165 and rotation of the gear ring 163.

At Block 309, a clearance gap between a blade tip 123 of the turbine stage 124 and the radially inner surface 120 of a blade track 118 may be measured on inferred. The blade tip clearance 125 may be measured, for example with sensors positioned at, in, on, or proximate the radially inner surface 120, or may be inferred, for example through the use of a parameter schedule that correlates various operating conditions of the engine with an expected clearance 125.

At Block 311, the actuator 116 may be actuated to move the control ring 112 in an axial direction. The step of actuating the actuator may comprise articulating a lever arm 130, rotating a pinion gear 165, and/or rotating a gear ring 163 engaged with a blade track support assembly.

At Block 313 one or more blade track support assemblies 153 may be rotated. Rotation of the blade track support assemblies 153 may effect adjustment of the radial position of one or more blade tracks 118.

Method 300 ends at Block 315.

The present disclosure presents several advantages over prior art systems for maintaining a blade tip clearance. The systems and methods disclosed in the present disclosure remove complex systems, particularly those requiring a steady supply of cooling air or other pneumatic fluid to maintain and control the radial position of a blade track. The disclosed systems herein are simpler and less expensive to manufacture and maintain. Additionally, the disclosed systems and methods provide for a rapid and precise adjustment of the radial position of a blade track.

Although the above embodiments are discussed with reference to a turbine of a gas turbine engine, the present disclosure may be applicable to compressors and compressor stages of a gas turbine engine as well. Further, the present disclosure may be applicable to other rotating machines having a turbine or compressor stage, and/or having a rotating bladed disk requiring blade tip clearance control.

Although examples are illustrated and described herein, embodiments are nevertheless not limited to the details shown, since various modifications and structural changes may be made therein by those of ordinary skill within the scope and range of equivalents of the claims.

What is claimed is:

1. An assembly for adjusting a radial position of one or more blade tracks radially encasing blades of a turbine stage in a gas turbine engine, said assembly comprising:
   a static turbine casing;
   a plurality of blade track carriers carried by said static turbine casing, said plurality of blade track carriers forming a segmented annular member extending around a circumference of and radially inward of said static turbine casing, each of said plurality of blade track carriers comprising a pair of radially extending flanges spaced apart by an axial flange to define a carrier channel, each of said radially extending flanges defining at least one bore in radial and axial alignment with each other forming a pair of bores;
   a plurality of blade track support assemblies, each of said plurality of blade track support assemblies having an axis of rotation parallel to an axis of said static turbine casing, each of said plurality of blade track support assemblies comprising a portion extending through each bore in the pair of bores, one or more cam-shaped portions rotatable about the axis of rotation, and a geared head, the geared head extending from an end of the portion extending through the pair of bores, wherein one of the pair of radially extending flanges is between the geared head and the cam-shaped portion;
   an actuator for rotating each of said cam-shaped portions about the axis of rotation, the actuator comprising an annular gear ring engaged with the geared head; and
   a plurality of blade tracks, each of the plurality of blade tracks comprising an arcuate flange having a radially inner surface forming at least a part of a radially outer flowpath boundary in the turbine stage and a support flange extending radially from the arcuate flange into the carrier channel of each of the plurality of blade track carriers, said support flange being carried by the one or more cam-shaped portions of the blade track support assemblies such that rotation of the one or more cam-shaped portion effects radial movement of the blade track.

2. The assembly of claim 1 wherein said actuator further comprises a pinion gear carried by the static turbine casing and engaged with the annular gear ring.

3. The assembly of claim 2 wherein said actuator further comprises a lever arm coupled to said pinion gear and positioned radially outward from the static turbine casing.

4. The assembly of claim 3 further comprising a spring washer disposed between one of said radially extending flanges of one of the plurality of blade track carriers and the geared head of one of said plurality of blade track support assemblies.

5. The assembly of claim 1 wherein said actuator further comprises at least three lever arms and at least three pinion gears, each of said pinion gears spaced about the circumference of and carried the static turbine casing, each of said pinion gears coupled to a respective one of said lever arms, and each of said pinion gears engaged with the annular gear ring.

6. The assembly of claim 5 further comprising a unison ring coupled to each of the at least three lever arms for uniform articulation of said lever arms.

7. The assembly of claim 1 wherein the support flange of each of the plurality of blade tracks defines a blade track bore, and said cam-shaped portion of each of said plurality of blade track support assemblies extends through a respective blade track bore to thereby carry a respective blade track.

8. The assembly of claim 1 wherein the support flange of each of the plurality of blade tracks defines a forward lip and an aft lip, and wherein the cam-shaped portion of each of said plurality of blade track support assemblies comprises first and second axial ends connected by a cross member, said first axial end positioned against the forward lip and said second axial end positioned against the aft lip to thereby carry each of said plurality of blade tracks.

9. The assembly of claim 1 wherein major surfaces of each radially extending flange extend laterally and are perpendicular to the axis of rotation of the turbine stage.

10. The assembly of claim 1 wherein said static turbine casing comprises a forward hook and an aft hook, and wherein each of said plurality of blade track carriers comprises a forward mount arm and an aft mount arm, said blade track carrier carried by said static turbine casing by engagement of said forward mount arm with said forward hook and said aft mount arm with said aft hook.

11. The assembly of claim 1 wherein at least one of said plurality of blade tracks comprises ceramic matrix composite.

12. An assembly for adjusting a radial position of a blade track relative to a blade of a turbine stage in a gas turbine engine, said assembly comprising:
    a static turbine casing;
    a blade track carrier carried by said static turbine casing, said blade track carrier positioned radially inward of said static turbine casing and comprising a pair of radially extending flanges spaced apart by an axial flange to define a carrier channel, each of said radially extending flanges defining at least one bore in radial and axial alignment with each other forming a pair of bores;
    a blade track support assembly having an axis of rotation parallel to an axis of said static turbine casing, said blade track support assembly comprising a portion extending through each bore in the pair of bores, one or more cam-shaped portions rotatable about the axis of rotation, and a geared head, the geared head extending from an end of the portion extending thorough the pair of bores, wherein one of the pair of radially extending flanges is between the geared head and the cam-shaped portion;
    an actuator for rotating said cam-shaped portion about the axis of rotation, the actuator comprising an annular gear ring engaged with the geared head; and
    a blade track comprising an arcuate flange having a radially inner surface forming at least a part of a radially outer flowpath boundary in the turbine stage and a support flange extending radially from the arcuate flange into said carrier channel of said blade track carrier, said support flange being carried by the cam-shaped portion of the blade track support assembly such that rotation of the cam-shaped portion effects radial movement of the blade track.

13. The assembly of claim 12 wherein the support flange of said blade track defines a blade track bore, and said cam-shaped portion of said blade track support assembly extends through said blade track bore to thereby carry said blade track.

14. The assembly of claim 12 wherein the support flange of said blade track defines a forward lip and an aft lip, and wherein said cam-shaped portion of said blade track support assembly comprises first and second axial ends connected by a cross member, said first axial end positioned against the forward lip and said second axial end positioned against the aft lip to thereby carry said blade track.

15. In a turbine engine having a static turbine casing and a turbine stage, a method of adjusting a radial position of a plurality of blade tracks, said method comprising:

carrying a plurality of blade track carriers by the static turbine casing to thereby form a segmented annular member extending around a circumference of and radially inward of the static turbine casing, each of said blade track carriers comprising a pair of radially extending flanges spaced apart by an axial flange to define a carrier channel, each of said radially extending flanges defining at least one bore in radial and axial alignment with each other forming a pair of bores;

carrying the plurality of blade tracks with one or more of said plurality of blade track carriers, each of the plurality of blade tracks carried by a blade track support assembly comprising a portion extending through each bore in the pair of bores, one or more cam-shaped portions rotatable about an axis of rotation, and a geared head, the geared head extending from an end of the portion extending through the pair of bores, wherein one of the pair of radially extending flanges is between the geared head and the cam-shaped portion;

engaging said blade track support assembly with an actuator for rotating the blade track support assembly, the actuator comprising an annular geared ring engaged with the geared head; and actuating the actuator to rotate the blade track support assembly and thereby effect radial movement of the blade track.

16. The method of claim 15 wherein said actuator comprises an annular gear ring engaged with said blade track support assembly, the step of actuating the actuator comprises:

rotating said annular gear ring to effect rotation of said blade track support assembly.

17. The method of claim 16 wherein said actuator further comprises a lever arm coupled to said annular gear ring by one or more pinion gears, and wherein the step of actuating the actuator comprises articulating the lever arm.

18. The method of claim 15 further comprising:

measuring a clearance gap between a blade tip of the turbine stage and a radially inner surface of said blade tracks; and actuating said actuator responsive to the measured clearance gap.

19. The method of claim 15 further comprising:

inferring a clearance gap between a blade tip of the turbine stage and a radially inner surface of said blade tracks; and actuating said actuator responsive to the inferred clearance gap.

* * * * *